United States Patent Office 3,203,959
Patented Aug. 31, 1965

---

3,203,959
PROCESS FOR PREPARING 5-AMINO-1,2,4-OXADIAZOLES
Kenneth Robert Huffman, Stamford, Conn., assignor to American Cyanamid Company, Stamford, Conn., a corporation of Maine
No Drawing. Filed Mar. 5, 1963, Ser. No. 262,843
6 Claims. (Cl. 260—307)

This invention relates to 5-amino-1,2,4-oxadiazoles and to a process for preparing the same.

G. Palazzo and G. Strani in Gazz. Chim. Ital., 90, 1290 (1960) describe two methods for the preparation of 5-amino-3-aryl-1,2,4-oxadiazoles. In one procedure, benzoximino chloride and sodium acid cyanamide are reacted to form the desired oxadiazole. However, in view of the relative inaccessibility of benzoximino chloride and of the reported low yield, this method is not particularly attractive. In the second procedure, 5-amino-3-aryl-1,2,4-oxadiazole and 5-amino-3-p-tolyl-1,2,4-oxadiazole are obtained from the corresponding amidoxime. This method is not especially advantageous because of the numerous steps required to obtain the desired oxadiazoles.

It has now been discovered that 5-amino-1,2,4-oxadiazoles of the formula:

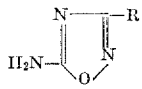

in which R is selected from the group consisting of alkyl, halo-, carbalboxy- and aryl-substituted alkyl, aryl and halo-, nitro- and alkyl-substituted aryl may be prepared in good yield by reacting an N-cyanoimidate with hydroxylamine in an inert reaction medium at temperatures of from about 0° C. to about 50° C. and preferably from about 20° C. to about 30° C. according to the following equation:

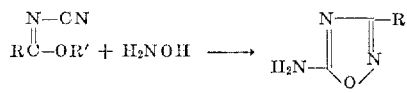

in which R has the meaning as defined above and in which R' is lower alkyl, e.g., methyl, ethyl, propyl, isopropyl, butyl and isobutyl.

The reactant N-cyanoimidates which are employed in the process of this invention are described and claimed in copending application Serial No. 262,851, filed concurrently herewith by Frederic Charles Schaefer and Kenneth Robert Huffman. This copending application also discloses and claims processes for preparing N-cyanoimidates by reaction of an ortho ester with cyanamide in the presence of an acid or acid anhydride by reaction of a ketone acetal with cyanamide, by reaction of an imidate hydrohalide with cyanamide, and by reaction of an imidate with a cyanogen halide.

Suitable N-cyanoimidiates which may be employed in the process of this invention are methyl N-cyanoacetimidate, methyl N-cyano-2-phenylacetimidate, methyl 2-chloro-N-cyanoacetimidate, ethyl 2-chloro-N-cyanoacetimidate, methyl N-cyanobenzimidate, ethyl 2-carbethoxy-N-cyanoacetimidate and the like.

In carrying out the process of this invention, an N-cyanoimidate is mixed with a hydroxylamine salt, e.g. the hydrochloride or sulfate, in the presence of an organic base in an inert reaction medium such as methanol ethanol or the like at a temperature of from about 0° C. to about 50° C. Such base, e.g., trimethylamine, triethylamine or the like, is added to the reaction mixture in order to convert the hydroxylamine salt to free hydroxylamine for reaction. After a suitable reaction period, usually up to about several hours, the inert reaction medium is removed and the residue is recrystallized from water and from solvents such as ether, benzene and the like. Further purification affords the product 5-amino-1,2,4-oxadiazole in substantially high purity and in good yield.

The compounds prepared by the process of this invention are valuable as agricultural chemicals and intermediates for the preparation thereof. Thus, herbicidal activity has been demonstrated for 5-amino-3-carbethoxymethyl-1,2,4-oxadiazole and 5-amino-3-chloromethyl-1,2,4-oxadiazole. Also, the dithiophosphate derivative of 5-amino-3-chloromethyl-1,2,4-oxadiazoles exhibits noteworthy insecticidal activity.

In order to illustrate the present invention, the following non-limiting examples are given.

EXAMPLE 1

*5-amino-3-methyl-1,2,4-oxadiazole*

A stirred mixture of 1.40 g. (0.020 mole) of hydroxylamine hydrochloride and 2.0 g. of triethylamine (0.020 mole) in 10 ml. of ethanol is treated dropwise with 1.95 g. (0.020 mole) of methyl N-cyanoacetimidate. Toward the end of the adidtion, the reaction mixture is cooled to keep the temperature below 40° C. After 30 minutes, the now clear solution is evaporated to dryness and the residue is recrystallized from water to give 1.35 g. (69%) of product white needles, M.P. 153–157° C. Further recrystallization raises the M.P. to 159–160.5° C.

*Analysis.*—Calculated for $C_3H_5N_3O$: C, 36.36; H, 5.08; N, 42.41. Found: C, 36.23; H, 5.28; N, 42.62.

EXAMPLE 2

*5-amino-3-phenyl-1,2,4-oxadiazole*

To 3 ml. of methanol is added 0.40 g. of methyl N-cyanobenzimidate, 0.18 g. of hydroxylamine hydrochloride and 0.25 g. of triethylamine. The mixture becomes warm and a clear solution forms on shaking. After an hour, the methanol is removed and the residue is recrystallized from water and benzene to give 0.35 g. (88%) of product, M.P. 147–148° C.

EXAMPLE 3

*5-amino-3-chloromethyl-1,2,4-oxadiazole*

The procedure of Example 1 is repeated in all essential respects except that 2.65 g. of methyl 2-chloro-N-cyanoacetimidate (0.020 mole) are employed. An oily residue is obtained which is crystallized from water. Extraction of the mother liquor with ether yields more product, which is recrystallized from benzene. The total yield of crude product is 1.60 g. (60%). Two further recrystallizations from benzene affords colorless prisms, M.P. 125–127° C.

*Analysis.*—Calculated for $C_3H_4ClN_3O$: C, 26.98; H, 3.02; N, 31.47; Cl, 26.55. Found: C, 27.41; H, 2.95; N, 31.13; Cl, 26.34.

EXAMPLE 4

*5-amino-3-carbethoxymethyl-1,2,4-oxadiazole*

Ethyl 2-carbethoxy-N-cyanoacetimidate, 1.85 g., is treated with hydroxylamine as in Example 1. After the methanol has been removed, the mush residue is dissolved in water and extracted twice with ether. Evaporation of the dried extracts affords an oil which crystallizes on standing overnight. The yield of product which is recrystallized once from water and once from benzene-petroleum ether is 1.20 g. (70%), M.P. 68–70°C.

*Analysis.*—Calculated for $C_6H_9N_3O$: C, 42.11; H, 5.30; N, 24.55. Found: C, 42.09; H, 5.08; N, 24.33.

While the present invention has been described in detail as to specific embodiments thereof, it is not intended that these details constitute undue limitations upon the scope of the invention, excepting, of course, insofar as these limitations appear in the appended claims.

I claim:
1. A process for preparing a 5-amino-1,2,4-oxadiazole of the formula:

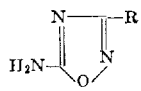

in which R is selected from the group consisting of alkyl, halo-, carbalkoxy- and aryl-substituted alkyl, aryl and halo-, nitro- and alkyl-substituted aryl which comprises bringing into reactive contact at a temperature of from about 0° C. to about 50° C. in an inert reaction medium an N-cyanoimidate of the formula:

in which R is as defined hereinabove and R' is lower alkyl with hydroxylamine.

2. A process as in claim 1 in which hydroxylamine is derived from a hydroxylamine salt and said process is conducted in the presence of base.

3. A process as in claim 2 in which R and R' are each methyl.

4. A process as in claim 2 in which R is phenyl, and R' is methyl.

5. A process as in claim 2 in which R is 2-chloromethyl and R' is methyl.

6. A process as in claim 2 in which R is 2-carbethoxymethyl and R' is ethyl.

No references cited.

NICHOLAS S. RIZZO, *Primary Examiner.*
JOHN D. RANDOLPH, *Examiner.*

UNITED STATES PATENT OFFICE
CERTIFICATE OF CORRECTION

Patent No. 3,203,959 August 31, 1965

Kenneth Robert Huffman

It is hereby certified that error appears in the above numbered patent requiring correction and that the said Letters Patent should read as corrected below.

Column 1, line 31, for "carbalboxy-" read -- carbalkoxy- --; line 54, for "ketone" read -- ketene --; same column 1, line 66, after "methanol" insert a comma.

Signed and sealed this 15th day of March 1966.

(SEAL)

Attest:

ERNEST W. SWIDER

Attesting Officer

EDWARD J. BRENNER

Commissioner of Patents